(12) United States Patent
Williamson

(10) Patent No.: US 6,382,124 B1
(45) Date of Patent: May 7, 2002

(54) STREAMER HANDLING APPARATUS FOR USE ON SEISMIC SURVEY VESSELS

(76) Inventor: Mark Richard Williamson, 31 Andrews Close, Epsom, Surrey, KT17 4EX (GB)

( * ) Notice: Subject to any disclaimer, the term of this patent is extended or adjusted under 35 U.S.C. 154(b) by 0 days.

(21) Appl. No.: 09/701,549
(22) PCT Filed: Jun. 4, 1999
(86) PCT No.: PCT/GB99/01760
  § 371 Date: Nov. 29, 2000
  § 102(e) Date: Nov. 29, 2000
(87) PCT Pub. No.: WO99/65763
  PCT Pub. Date: Dec. 23, 1999

(30) Foreign Application Priority Data

Jun. 12, 1998 (GB) .............................................. 9812817

(51) Int. Cl.[7] .................... B63B 21/04; B63B 21/66; F16L 1/12
(52) U.S. Cl. .................... 114/253; 114/244; 405/166
(58) Field of Search .................... 114/242, 244, 114/253, 254; 254/134.3 SC; 367/15–24; 405/166, 168.3

(56) References Cited

U.S. PATENT DOCUMENTS

| | | | | |
|---|---|---|---|---|
| 3,889,621 A | * | 6/1975 | Pease ......................... | 114/294 |
| 3,982,402 A | * | 9/1976 | Lang et al. .............. | 405/468.3 |
| 4,313,392 A | * | 2/1982 | Guenther et al. ........... | 114/244 |
| 4,480,574 A | * | 11/1984 | Bertrams .................... | 114/254 |
| 5,520,135 A | * | 5/1996 | Rolland et al. ............. | 114/254 |

* cited by examiner

Primary Examiner—S. Joseph Morano
Assistant Examiner—Andrew D. Wright

(57) ABSTRACT

A streamer handling and towing system for a seismic survey vessel comprises a beam (42) secured to the underside of the deck (50) of the vessel immediately above the streamer deck (20), so that it extends generally longitudinally of the vessel above normal head height. The beam (42) is pivoted at its stern end, and supported at its other end (54) by a telescopic arm (56) which can lower that end towards the streamer deck (20). A carriage (60) supporting a spooling block (34) for the streamer (28) is movable in both directions along the beam (42). During towing, the beam (42) is held in its raised position, with the spooling block (34) at the stern end of the beam. When it is desired to work on the streamer, the carriage (60) is moved along the beam (42) to the other end, which is then lowered towards the streamer deck (20) to provide convenient waist high access to the streamer.

12 Claims, 5 Drawing Sheets

STREAMER HANDLING APPARATUS FOR USE ON SEISMIC SURVEY VESSELS

This invention relates to streamer handling apparatus for use on seismic survey vessels, and is more particularly concerned with such apparatus for use on seismic survey vessels of the kind used in performing 3D marine seismic surveys covering large areas.

In order to perform a 3D marine seismic survey, a plurality of seismic streamers, each typically several thousand meters long and containing arrays of hydrophones and associated electronic equipment distributed along its length, are towed at about 5 knots behind a seismic survey vessel, which also tows one or more seismic sources, typically air guns. Acoustic signals produced by the seismic sources are directed down through the water into the earth beneath, where they are reflected from the various strata. The reflected signals are received by the hydrophones in the streamers, digitised and then transmitted to the seismic survey vessel, where they are recorded and at least partially processed with the ultimate aim of building up a representation of the earth strata in the area being surveyed.

At the present time, a typical streamer array used by the Applicant comprises a 700 meter wide array of eight evenly spaced streamers, each about 4000 meters long. The streamers are towed by their lead-ins, ie the armoured electrical cables that convey electrical power, control and data signals between the vessel and the streamers, as described in the Applicant's U.S. Pat. No 4 798 156, and their spread is controlled and maintained by MONOWING deflectors of the kind described in the Applicant's U.S. Pat. No 5 357 892.

An array of this relatively large size allows 3D seismic surveys of large areas to be performed very efficiently. However, because the cost of performing such surveys is so high, there is continuous pressure to improve efficiency still further. One way of achieving this is to use even wider streamer arrays, containing even more streamers. However, the deployment and recovery of the streamers at the beginning and end of such a survey is itself a time-consuming process, which can also be hazardous. Each streamer is typically made up of 100 meter sections, and has auxiliary equipment such as depth controllers ("birds"), acoustic position sensors and the like secured to it at intervals along its length. This auxiliary equipment is typically attached to and detached from the streamer during deployment and recovery of the streamer.

It is therefore an object of the present invention to provide streamer handling apparatus which facilitates safe and speedy deployment and recovery of a streamer.

According to the present invention, therefore, there is provided streamer handling apparatus for use on a seismic survey vessel, the apparatus comprising:

a beam;

means for mounting the beam above normal head height above the streamer deck of the vessel, such that the beam extends generally longitudinally of the vessel, the mounting means including a pivotal connection to the sternmost end of the beam permitting said end to pivot about a horizontal axis extending generally transversely of the beam, and support means for lowering and raising the other end of the beam towards and away from the streamer deck; and pulley means for supporting and guiding the streamer, said pulley means being secured to and movable along the beam.

In a preferred embodiment of the invention, the pulley means comprises carriage means movable along the beam, a pulley device, and means for suspending the pulley device beneath the carriage means.

Preferably, the suspension means comprises a collar which is rotatably supported on the carriage means and which is rotatable about the longitudinal axis of the beam.

Additionally, the pulley device is preferably pivotable about a horizontal axis which extends generally transversely of the beam.

The carriage means preferably includes at least one hydraulic motor arranged to move it in both directions along the beam, and is advantageously provided with hoisting means at its stern most end.

Conveniently, the support means comprises a telescopic member which is pivotally connected at one end to the mounting means and at the other end to said other end of the beam, and is hydraulically operated.

The apparatus may further comprise downwardly projecting guidance means which is positioned at said other end of the beam and which engages and pushes down the streamer when said other end of the beam is lowered.

The invention also includes a seismic survey vessel incorporating streamer handling apparatus as defined in any of the preceding statements of invention.

The invention will now be described, by way of example only, with reference to the accompanying drawings, of which:

Figure 1:
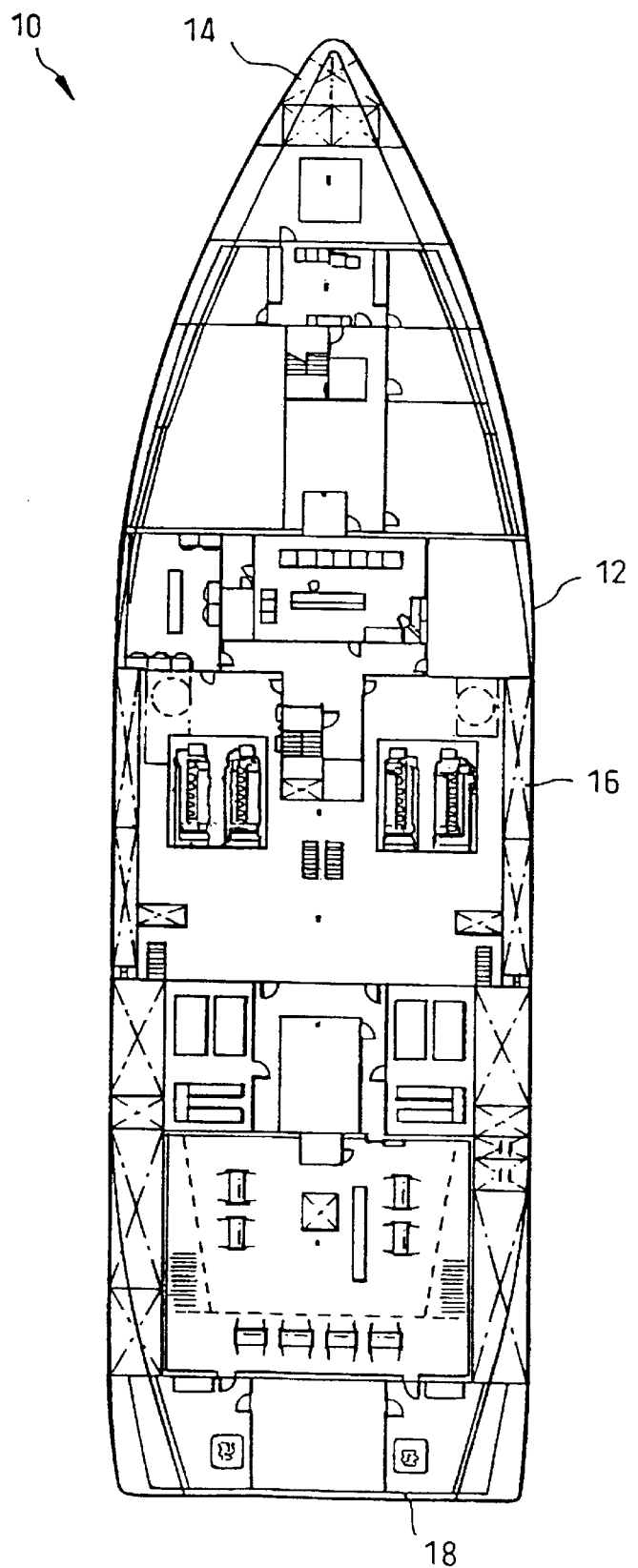
FIG. 1 is a plan view of a deep marine seismic survey vessel, substantially at the level of its waterline, the vessel incorporating streamer handling apparatus in accordance with the present invention.

The deep marine seismic survey vessel shown in the drawings is indicated generally at 10, and has a displacement monohult 12 which is typically just over 80 meters long at the waterline (and just under 90 meters long overall), with a beam of about 24 meters. The maximum displacement of the vessel 10 is typically about 7500 tons.

As can be seen in FIG. 1, the shape of the hull 12 at the waterline is fairly conventional, in that the width of the hull increases smoothly and progressively from the bow 14 to a centre section 16 of substantially uniform width, and then progressively decreases, but to a much lesser extent, from the centre section to a wide cutoff stern 18. Below the waterline, the taper towards the stern 18 increases progressively with depth.

The vessel 10 has most if not all of the major features common to a vessel of its type and size, eg multiple diesel engines, bow thrusters, electric generators, accommodation for 60 to 70 persons, a helideck, winches/derricks, emergency equipment, etc. However, since these features can take any of several well known and conventional forms, and are not germane to the present invention, they will not be described in detail for the sake of simplicity.

Additionally, the vessel 10 is arranged in accordance with the invention for performing deep marine seismic surveys, as will now be described.

Figure 2:
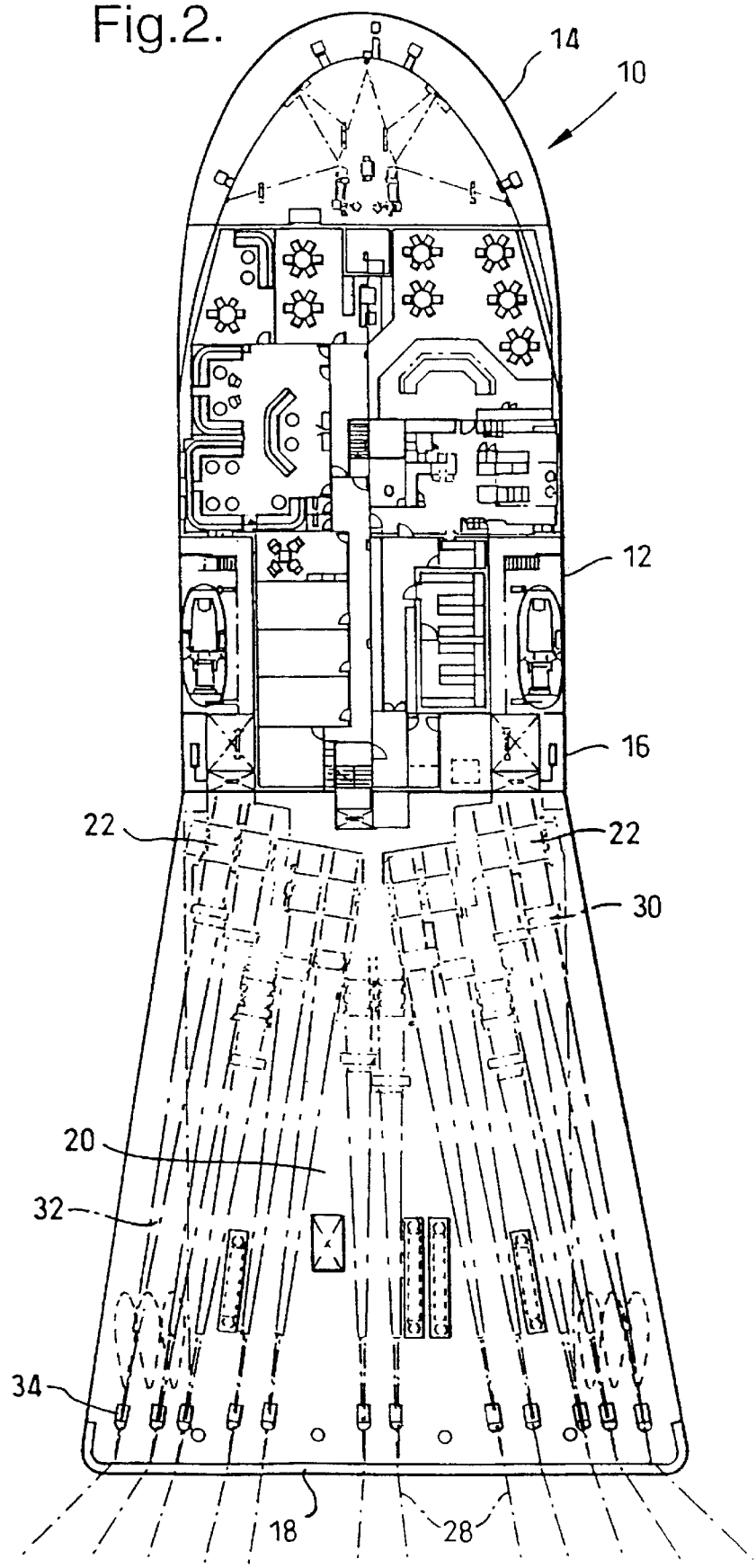
FIG. 2 is a plan view of the streamer deck of the vessel of FIG. 1.
Figure 3:
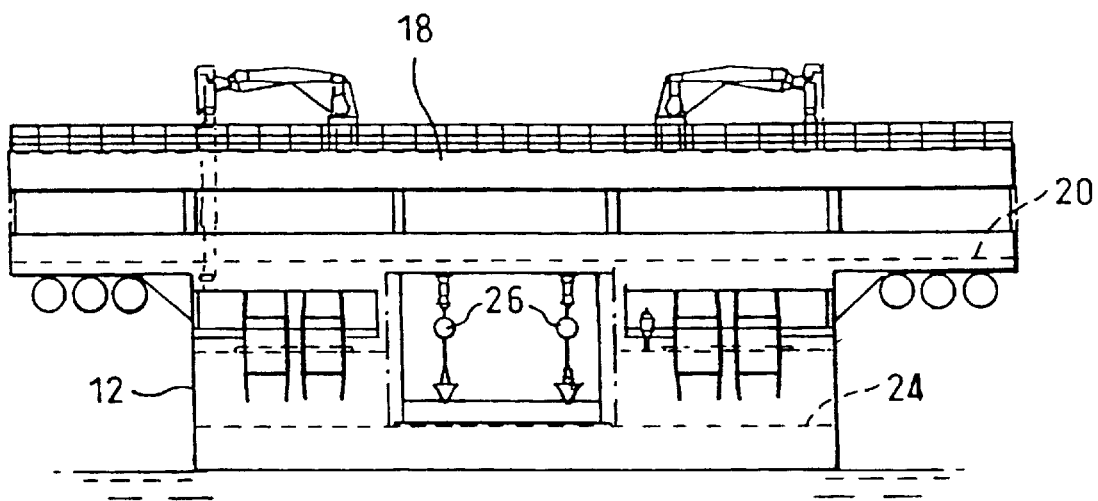
FIG. 3 is a stern view of the vessel of FIGS. 1 and 2.

Thus as can be seen in FIG. 2, the vessel 10 has a streamer deck 20 which extends aft from the centre section 16, increasing linearly in width as it does so from about 24 meters at the centre section to about 37.5 meters at the stern 18, the increase in width taking place symmetrically on each side of the fore-and-aft centre line of the vessel 10. The overall length of the streamer deck is about 36 meters, while the height of the streamer deck 20 above the waterline of the vessel 10 is typically about 9 meters.

Within the centre section 16 of the vessel 10, sixteen large powered streamer drums 22 are distributed across the width of the vessel, each drum having its axis extending substantially horizontally and transversely of the vessel 10 and being capable of storing a respective streamer up to 6000 meters long, together with its lead-in. The outer four drums 22 on each side of the centre line of the vessel 10 are mounted at least partly below the streamer deck 20, while the inner eight drums are mounted on the streamer deck itself, the drums being partly interleaved to fit them in the available space. The lower drums 22 overspool, while the upper ones underspool.

At the centre of the stern 18 of the vessel 10, beneath the streamer deck 20, is a deck 24 known as the gun deck. From the gun deck 24, seismic sources 26, typically multiple airgun seismic sources of the kind described in the Applicant's U.S. Pat. No 4,686,660, are deployed, typically using a handling system of the kind described in Applicant's U.S. Pat. No 5,488,920.

In use, the streamers, indicated rather diagrammatically at 28, each pass over a respective guide 30 and then along the length of the streamer deck towards the stern 18 of the vessel 10. As they pass over the streamer deck 20, the streamers 28 pass via respective tension relieving devices 32, and at the stern 28 they each pass over a respective further guide, this time in the form of a spooling block 34 with its axis extending substantially vertically. To save space, the spooling blocks 34 can be of the type described and claimed in the Applicant's PCT Patent Application No PCT/IB97/00156. Each spooling block 34 forms part of a respective streamer handling apparatus, which will be described in more detail hereinafter with reference to FIGS. 4 to 6.

Once deployed over the stern 18 of vessel 10, the twelve streamers 28, towed at about 5 knots by the vessel, are formed into an array typically up to 1100 meters wide, using Applicant's MONOWING deflectors as described hereinbefore. This wide streamer array is then used, in conjunction with the seismic sources 26, to perform a 3D marine seismic survey as described earlier.

The vessel 10 has a number of advantages over prior art seismic survey vessels of comparable size. For example, the fact that the vessel 10 has a substantially conventional displacement monohull means that it is not much more expensive to build than the prior art vessels. Further, the powered drums 22 with the streamers 28 wound on them are extremely heavy, so their location amidships, as low as conveniently possible, contributes to the stability and seaworthiness of the vessel 10.

Another major advantage of the vessel 10 lies in the substantially increased width of the streamer deck 20 at the stern 18 of the vessel. This facilitates the formation of the extra wide streamer array, inter alia by reducing the angles through which the lead-ins of the outer streamers 32 in particular are required to bend at the stern of the vessel to form the array. This latter feature reduces the stresses to which the lead-ins and the streamers 32 are subjected, so reducing the possibility of breakage. The increased width also provides more space at the stern 18 for working with the increased number of streamers 28 used to form the extra wide array. But because the streamer deck 20 is 9 meters above the waterline of the vessel 10, it does not significantly interfere with the docking of the vessel, since the deck will normally be well above the dock and will therefore merely project over it.

Figure 4:
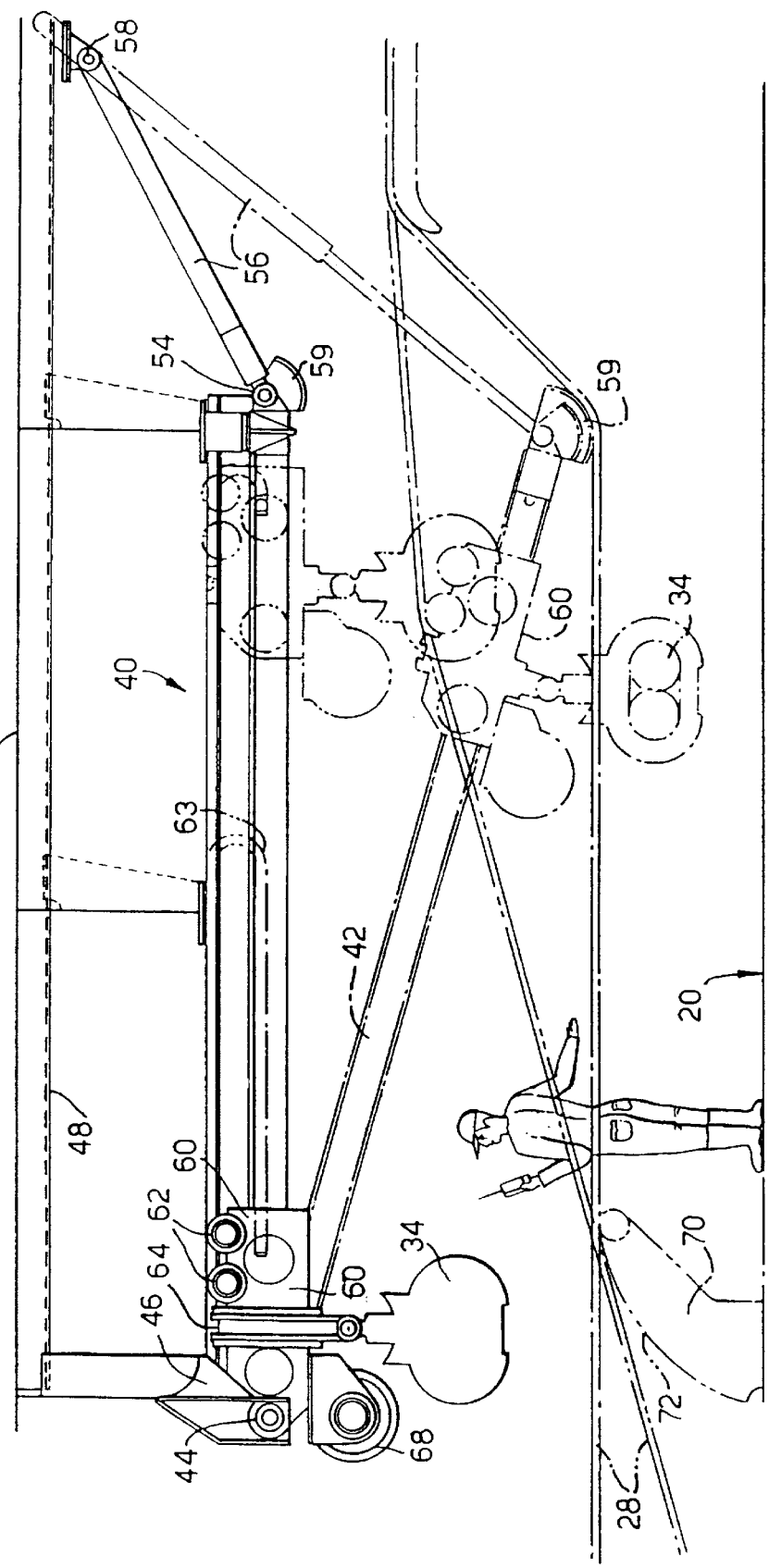
FIG. 4 is a side view of the streamer handling apparatus of the present invention.
Figure 5:
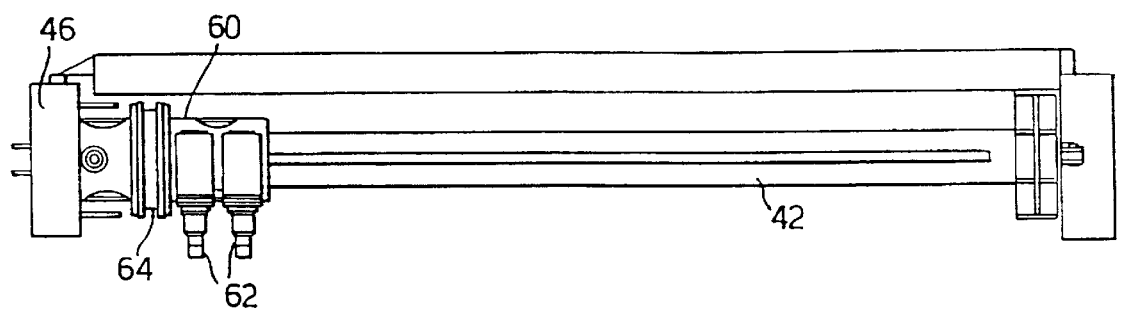
FIGS. 5 and 6 are top and end views respectively of the apparatus of FIG. 4.
Figure 6:
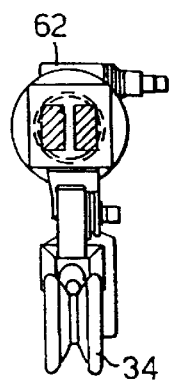

The extra space across the width of the streamer deck 20 at the stern 18 of the vessel 10 also creates sufficient room for the installation of new and improved streamer handling apparatus, one for each streamer: this new and improved streamer handling apparatus is shown in FIGS. 4 to 6.

The streamer handling apparatus of FIGS. 4 to 6 is indicated generally at 40, and comprises an elongate beam 42 which extends generally longitudinally of the vessel 10. The beam 42 is pivotally mounted at its end 44 nearer the stern 18 of the vessel to mounting structure 46, which is firmly secured to the underside 48 of the deck 50 of the vessel immediately above the streamer deck 20: the deck 50 is, in fact, the upper stern deck of the vessel.

The beams 42 of adjacent streamer handling apparatuses 40 diverge slightly, or fan out, towards the stern 18 of the vessel, to follow the increasing width of the stern.

As will become apparent hereinafter, the beam 42 normally extends parallel to the streamer deck 20 and the upper deck 50, ie substantially horizontally, at a height of nearly 4 meters above the former. To this end, the other end 52 of the beam 42 is pivotally connected to one end 54 of a hydraulically operated extendable telescopic arm 56, whose other end 58 is pivotally connected to the underside 48 of the upper deck 50. In its unextended state, the telescopic arm 56 securely holds the beam in its normal, horizontal, position, while extension of the telescopic arm 56 lowers the end 52 of the beam 42 to a height of about 1 meter above the streamer deck 20, ie to about waist height. Both the raised and lowered positions of the beam 42 are shown in FIG. 4.

A curved guide 59, effectively a 90° segment of a pulley wheel, is pivotally secured to the joined ends 52, 54 of the beam 42 and the telescopic arm 56 respectively.

Mounted on the beam 42 so as to be movable in both directions along it is a carriage 60. Motive power for the carriage 60 is provided by hydraulic motors 62, which typically move the carriage, on suitably positioned wheels (not shown), along the beam via a rack and pinion drive arrangement (not shown). Pressurised hydraulic fluid for the motors 62 is supplied via a long flexible pressure hose 63, which unfolds as the carriage 60 moves along the beam 42.

The carriage 60 rotatably supports a collar 64, which coaxially surrounds both the carriage and the beam 42 and is rotatable about the longitudinal axis of the beam. The collar 64 supports in turn the spooling block 34, which is effectively a particularly compact equivalent of a large radius pulley or fairlead. The spooling block 34 is pivotally suspended beneath the collar 64, so as to pivot about an axis extending generally transversely of the beam 42.

The end 66 of the carriage 60 nearer the stern end 44 of the beam 42 is provided with a winch 68.

In normal use, ie when the streamer 28 handled by the apparatus 40 is deployed and being towed, the beam 42 is held in its raised horizontal position, and the carriage 60 is locked at the stern end 44 of the beam. The streamer 28 passes over the spooling block 34, which is free by virtue of the ability of the collar 64 to rotate about the carriage 60 and the pivotal connection between the spooling block and the rotatable collar 64 to pivot both sideways and fore and aft, to accommodate lateral and vertical changes of direction of the streamer as it leaves the stern 18 of the vessel 10.

When it is desired to work on the streamer 28, eg to connect or remove a depth controlling "bird" or other device to it during deployment or recovery, the carriage 60 is moved towards the other end 52 of the beam 42 by the motors 62, and the telescopic arm 56 is extended, thus lowering the end 52 of the beam towards the streamer deck 22. As the end 52 of the beam 42 is lowered, the curved guide 59 engages the streamer 28, and pushes it down towards the streamer deck 22 until it reaches about the same level as the top of stern rail 70 of the streamer deck. The stern rail 70 extends substantially the whole width of the streamer deck 22, and is formed with a rearwardly-facing curved surface 72 which supports the lowered streamer 28. The surface 72, as well as each of the other curved surfaces which engage or are engaged by the streamers 28, is of sufficiently large radius to ensure that the minimum bending radius of the streamer is not exceeded.

Before or after the streamer 28 is fully lowered, the winch 68 can be coupled to a suitable attachment point on it, and then reeled in a little to take the strain off the portion of the streamer on the vessel, ie to the right of the attachment point to the hoist, as viewed in FIG. 4. Then, once the streamer 28 is fully lowered and no longer under tension, it is very easy to work on, being typically at waist height above the streamer deck 22. If desired, a bench or the like can be provided in the working area on the streamer deck 22, to make such work even easier.

The winch 68 is also used to raise and bring onto the streamer deck 22 auxiliary equipment associated with the streamer 28, eg tailbuoys, acoustic positioning equipment and the like.

The streamer handling apparatus 40 is thus particularly ergonomically advantageous. In its normal (or towing) condition, it is mostly disposed above head height above the streamer deck 22, leaving the deck relatively clear for personnel to move about. But in its lowered condition, it provides particularly good access to the streamer 28 passing through it Many modifications can be made to the streamer handling apparatus 40. For example, the hydraulic motors 62 can be replaced by electric motors, while the telescopic arm 56 can be replaced by any other support device capable of moving the end 52 of the beam 42 up and down between its raised and lowered positions.

Additionally, if there is no upper deck above the streamer deck 22, the mounting means for mounting the beam 42 above the streamer deck can comprise a suitably shaped frame supported on the streamer deck itself.

What is claimed is:

1. Streamer handling apparatus for use on a seismic survey vessel, the apparatus comprising:
   a beam;
   means for mounting the beam above normal head height above the streamer deck of the vessel, such that the beam extends generally longitudinally of the vessel, the mounting means including a pivotal connection to the sternmost end of the beam permitting said end to pivot about a horizontal axis extending generally transversely of the beam, and extendable support means for lowering and raising the other end of the beam towards and away from the streamer deck; and
   pulley means for supporting and guiding the streamer, said pulley means being secured to and movable along the beam.

2. Apparatus as claimed in claim 1, wherein the pulley means includes a pulley device which is pivotable about an axis which extends generally longitudinally of the beam.

3. Apparatus as claimed in claim 1, wherein the pulley means comprises carriage means movable along the beam, a pulley device, and means for suspending the pulley device beneath the carriage means.

4. Apparatus as claimed in claim 3, wherein the suspension means comprises a collar which is rotatably supported on the carriage means and which is rotatable about the longitudinal axis of the beam.

5. Apparatus as claimed in claim 4, wherein the carriage means includes at least one hydraulic motor arranged to move the carriage means in both directions along the beam.

6. Apparatus as claimed in claim 5, wherein the carriage means is provided at its sternmost end with winch means.

7. Apparatus as claimed in claim 6, wherein the pulley device is pivotable about a horizontal axis which extends generally transversely of the beam.

8. Apparatus as claimed in claim 7, wherein the support means comprises a telescopic member which is pivotally connected at one end to the mounting means and at the other end to said other end of the beam.

9. Apparatus as claimed in claim 8, wherein the support means is hydraulically operable.

10. Apparatus as claimed in claim 9, further comprising downwardly projecting guidance means which is positioned at said other end of the beam and which engages and pushes down the streamer when said other end of the beam is lowered.

11. A seismic survey vessel, comprising:
    streamer handling apparatus, the streamer handling apparatus including:
      a beam;
      means for mounting the beam above normal head height above a streamer deck of the vessel such that the beam extends generally longitudinally of the vessel, the mounting means including,
        a pivotal connection to the sternmost end of the beam permitting said end to pivot about a horizontal axis extending generally transversely of the beam, and
        extendable support means for lowering and raising the other end of the beam towards and away from the streamer deck; and
      pulley means for supporting and guiding the streamer, said pulley means being secured to and movable along the beam.

12. A seismic survey vessel of claim 11, wherein said vessel comprises said streamer deck and a further deck above said streamer deck, and wherein the means for mounting is secured to the underside of the further deck.

* * * * *